United States Patent
Sukegawa

(10) Patent No.: US 11,520,090 B2
(45) Date of Patent: Dec. 6, 2022

(54) DIFFRACTION DEVICE, SPECTROSCOPIC APPARATUS, AND MANUFACTURING METHOD OF DIFFRACTION DEVICE

(71) Applicant: CANON KABUSHIKI KAISHA, Tokyo (JP)

(72) Inventor: Takashi Sukegawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/929,543

(22) Filed: Jul. 15, 2020

(65) Prior Publication Data
US 2021/0026052 A1   Jan. 28, 2021

(30) Foreign Application Priority Data
Jul. 23, 2019 (JP) .............................. JP2019-135679

(51) Int. Cl.
*G02B 5/18* (2006.01)

(52) U.S. Cl.
CPC ......... *G02B 5/1885* (2013.01); *G02B 5/1852* (2013.01); *G02B 5/1857* (2013.01)

(58) Field of Classification Search
CPC ...... G02B 5/18; G02B 5/1809; G02B 5/1814; G02B 5/1866
See application file for complete search history.

(56) References Cited

U.S. PATENT DOCUMENTS

| | | | |
|---|---|---|---|
| 2005/0128591 A1* | 6/2005 | Shiozaki | G02B 6/29307 359/566 |
| 2013/0342909 A1* | 12/2013 | Sukegawa | G02B 5/1861 359/571 |
| 2015/0309220 A1* | 10/2015 | Greiner | G02B 5/18 359/350 |

FOREIGN PATENT DOCUMENTS

| | | |
|---|---|---|
| CN | 1393862 A | 1/2003 |
| CN | 101222009 A | 7/2008 |
| CN | 101551519 A | 10/2009 |
| JP | 2003075622 A | 3/2003 |

OTHER PUBLICATIONS

Extended European Search Report issued in European Appln. No. 20184701.9 dated Dec. 2, 2020.
Roman "Hadamard spectrometer for passive LWIR standoff surveillance" Proceedings of SPIE. 2007: pp. 67962I-1-67962I-10. vol. 6796.
Dali "Optical bistability in ZnS/ZnSe stratified grating wave filter" Proceedings of SPIE. 2001: pp. 166-168. vol. 4602.
Ikeda "Zinc sulfide and zinc selenide immersion gratings for astronomical high-resolution spectroscopy: evaluation of internal attenuation of bulk materials in the short near-infrared region" Optical Engineering. Aug. 2009: pp. 084001-1-084001-9. vol. 48(8).
Kuzmenko "Prospects for machined immersion gratings in the near infrared and visible" Proceedings of SPIE. 2006: pp. 62733S-1-62733S-7. vol. 6273.
Office Action issued in Chinese Patent Application No. 202010718667.0 dated Aug. 12, 2022. English translation provided.

\* cited by examiner

*Primary Examiner* — Robert E. Tallman

(74) *Attorney, Agent, or Firm* — Rossi, Kimms & McDowell LLP

(57) ABSTRACT

A diffraction device includes a ZnS member and a ZnSe member coupled to the ZnS member, and a diffraction grating is provided on the ZnSe member.

14 Claims, 3 Drawing Sheets

DIFFRACTION DEVICE, SPECTROSCOPIC APPARATUS, AND MANUFACTURING METHOD OF DIFFRACTION DEVICE

BACKGROUND OF THE INVENTION

Field of the Invention

The present invention relates to a diffraction device, a spectroscopic apparatus, and a manufacturing method of the diffraction device.

Description of the Related Art

A phase diffraction grating is a diffraction grating in which the shape of each grating groove is formed to be a sawtooth shape (blazed shape), a sine wave shape, a rectangular wave shape, or the like to give a phase difference to incident light within one period of the grating so that the diffracted light intensity characteristics can be selected in accordance with an application. The blazed diffraction grating is a phase diffraction grating including grating grooves each having a triangular cross section. The blazed diffraction grating is manufactured by forming grating grooves each having a predetermined cross-sectional shape through ruling to transfer the tool shape, etching by a directional beam, grinding using a grindstone, or cutting using a diamond bite.

In many cases, the blazed diffraction grating made of a crystalline material and manufactured by cutting is a diffraction grating designed to use high-order diffracted light. Accordingly, in order to obtain good optical properties, it is necessary to perform machining to form the grating grooves in a ductility mode. A critical cut thickness exists at the boundary between the ductility mode and the brittle mode. The critical cutting thickness depends on the relationship between the crystal orientation of the sliding face of the crystal and the processed face, the relationship between the crystal axis and the cutting direction, and the relationship between the crystal axis and the cutting force direction (depending on the tool rake angle and the cutting direction). For example, Japanese Patent Laid-Open No. 2003-075622 describes that grating grooves are formed by performing ultra-precision cutting on a crystalline material made of Si or Ge while using a single-crystal diamond bite.

When manufacturing a diffraction grating such as a blazed diffraction grating made of a semiconductor material by machining using a diamond tool, the brittle mode processing face unique to the material tends to be dominant in processing. In order to obtain the shape accuracy, the dimensional accuracy, and the surface roughness required for the diffraction grating, it is necessary to implement the processing under the processing conditions in the ductility mode. In addition, the diffraction grating has a structure with dimensions according to the wavelength to be used. A diffraction grating that can be used in a certain application has a very long grating length, which results in a very long distance to be processed. This leads to tool wear and makes it difficult to obtain a diffraction grating of a desired shape. Since it is difficult to obtain a large single crystal, each of large ZnS and ZnSe material generally has a polycrystalline structure. The polycrystalline structure is an assembly of fine single crystal structures, so a unique crystal orientation relationship as in the single crystal cannot be defined in the polycrystalline structure, but a critical cutting thickness still exists under an appropriate condition.

There is known a shaper method in which a diamond bite having the same cross-sectional shape as the cross-sectional shape of the groove face of the diffraction grating in the dispersion direction (the direction orthogonal to the groove extending direction) is translated in the direction (the groove extending direction) orthogonal to the dispersion direction to transfer its shape to a material. In the shaper method, when grooves each having a depth of about 200 nm to 200 µm are formed in the diffraction grating, in order to obtain a good optical surface, it is necessary to set a maximum cutting thickness equal to or smaller than the critical cutting thickness and repeat processing several tens to hundreds times. Accordingly, the total distance that needs to be cut is not simply the total length of the grating but several tens to hundreds of times the length of the grating. Therefore, it can be said that it is extremely difficult to obtain a practical diffraction device using a material that causes non-negligible tool wear. In a fly-cut method in which a diamond tool is rotated to perform processing, the maximum cutting thickness equal to or smaller than the critical cutting thickness is set by adjusting the traveling speed in the groove direction in accordance with the rotation speed. Accordingly, the tip end portion of the diamond tool is forced to have many number of contacts with the material, and this also causes a problem of wear.

It is a common method to continue processing of the material while replacing the worn tool. However, in order to obtain an excellent diffraction efficiency, it is necessary to have an accuracy such that the interval or shape of the diffraction grating is from a few nanometers to a few micrometers. Therefore, many difficulties and a long time are required to change and adjust the tool during processing.

In processing of ZnS (zinc sulfide), the diamond tool is greatly worn. Therefore, even if the critical cutting thickness is used as a parameter, a shape error and a defect due to tool wear cannot be avoided, and a deterioration in optical performance of the diffraction grating caused by processing cannot be avoided. On the other hand, in processing of ZnSe (zinc selenide), the wear of the diamond tool is small, so that it is possible to process a diffraction grating having a stable optical performance while using the critical cutting thickness as a parameter.

On the other hand, from the viewpoint of optical characteristics, ZnS has a high transmittance even in the vicinity of the near infrared region (750 nm), but ZnSe has a large light absorption in the vicinity of the near infrared region. In a diffraction grating formed of ZnSe, it is difficult for a device having a thickness larger than 10 mm to achieve a high efficiency.

SUMMARY OF THE INVENTION

The present invention provides a technique advantageous in facilitating the manufacture of a diffraction grating.

One of aspects of the present invention provides a diffraction device comprising a ZnS member and a ZnSe member coupled to the ZnS member, wherein a diffraction grating is provided on the ZnSe member.

Further features of the present invention will become apparent from the following description of exemplary embodiments with reference to the attached drawings.

DESCRIPTION OF THE EMBODIMENTS

Figure 1:
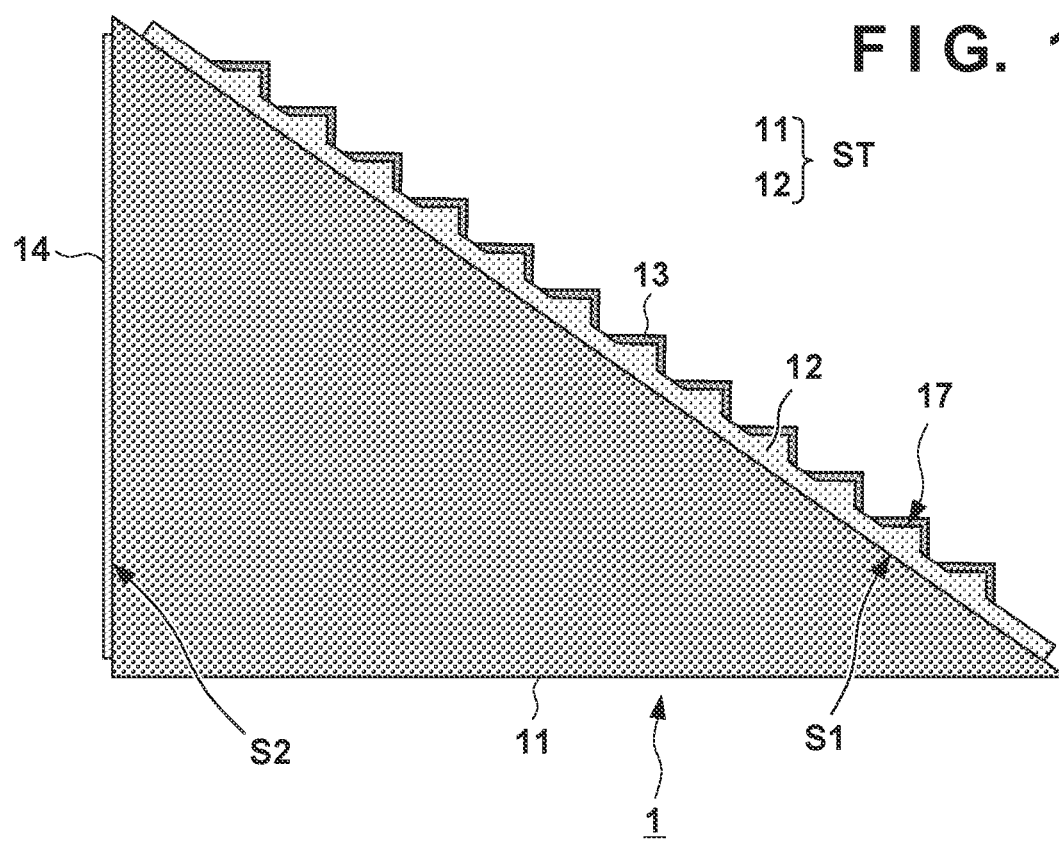
FIG. 1 is a view schematically showing the arrangement of a diffraction device according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

FIG. 1 schematically shows the arrangement of a diffraction device 1 according to an embodiment of the present invention. The diffraction device 1 includes a ZnS member 11 and a ZnSe member 12 coupled to the ZnS member 11. The ZnSe member 12 is coupled to a first face S1 of the ZnS member 11. A diffraction grating 17 is provided on the ZnSe member 12. The ZnS member 11 is formed of ZnS. ZnS has a good transmittance to light in the infrared region including the near infrared region. The ZnS member 11 can have a prism shape. The ZnSe member 12 is formed of ZnSe. The maximum thickness (the maximum thickness in a direction orthogonal to the first face S1) of the ZnSe member 12 can be within a range of, for example, 150 µm (inclusive) to 1,000 µm (inclusive). The ZnSe member 12 can be coupled to the ZnS member 11 by, for example, optical contact bonding. Alternatively, the ZnSe member 12 is formed by depositing a ZnSe material on the ZnS member 11 using a deposition method, so that the ZnSe member 12 coupled to the ZnS member 11 can be formed.

The diffraction device 1 can be configured as an immersion diffraction device or a transmissive diffraction device. The diffraction grating 17 can be configured as a blazed diffraction grating. A film 13 can be provided on the surface of the diffraction grating 17. In the immersion diffraction device 1, a reflection film can be provided as the film 13. Such a reflection film can be a film having a high reflectance to light in the infrared region, for example, a metal-based film. In the transmissive diffraction device 1, an antireflection film can be provided as the film 13. An antireflection film 14 can be provided on a second face S2 of the ZnS member 11. The second face S2 of the ZnS member 11 can be an incident face on which light enters from the outside. In the arrangement of the immersion diffraction device 1, the second face S2 can also be an emission face. In this case, light having entered the second face S2 is transmitted through the inside of the ZnS member 11 to reach the diffraction grating 17, diffracted by the diffraction grating 17, again transmitted through the inside of the ZnS member 11, and passes through the emission face to exit to the outside. The antireflection film 14 reduces the reflection loss generated when light enters the second face S2 and the reflection loss generated when light exits from the second face S2.

The manufacturing method for manufacturing the diffraction device 1 can include a forming step of forming a structure ST in which the ZnS member 11 and the ZnSe member 12 are coupled to each other, and a processing step of forming the diffraction grating 17 on the ZnSe member 12 in the structure ST. In the forming step, the ZnS member 11 having a prism shape and the ZnSe member 12 having a plate shape are prepared, and the structure ST can be formed by coupling the ZnSe member 12 to the ZnS member 11 by optical contact bonding. Alternatively, in the forming step, the ZnS member 11 having a prism shape is prepared, and the structure ST can be formed by depositing a ZnSe material on the ZnS member 11 using a deposition method to form the ZnSe member 12. The deposition method can be, for example, a CVD method. In the structure ST formed in the forming step, the ZnSe member 12 can have a thickness (the thickness in a direction orthogonal to the first face S1) within a range of, for example, 150 µm (inclusive) to 1,000 µm (inclusive).

In the processing step, the diffraction grating 17 can be formed, using a tool such as a diamond tool, on the ZnSe member 12 in the structure ST formed in the forming step. The maximum thickness (the maximum thickness in a direction orthogonal to the first face S1) of the ZnSe member 12 with the diffraction grating 17 formed thereon can be within a range of, for example, 150 µm (inclusive) to 1,000 µm (inclusive). Here, if a tool such as a diamond tool is used to process the ZnS member, there is a problem that a shape error or a defect occurs due to wear of the tool, as has been described above. On the other hand, in processing of the ZnSe member, wear of the tool is less than that in processing of the ZnS member. Therefore, in the processing step according to this embodiment, brittle fracture can be minimized by processing the ZnSe member 12 using a cutting thickness equal to or smaller than the critical cutting thickness. Thus, the diffraction grating 17 of a good quality can be obtained.

In addition, a step of forming the film 13 (reflection film or antireflection film) on the surface of the diffraction grating 17 can be performed. Further, a step of forming the antireflection film 14 on the second face S2 of the ZnS member 11 can be performed.

Figure 2:
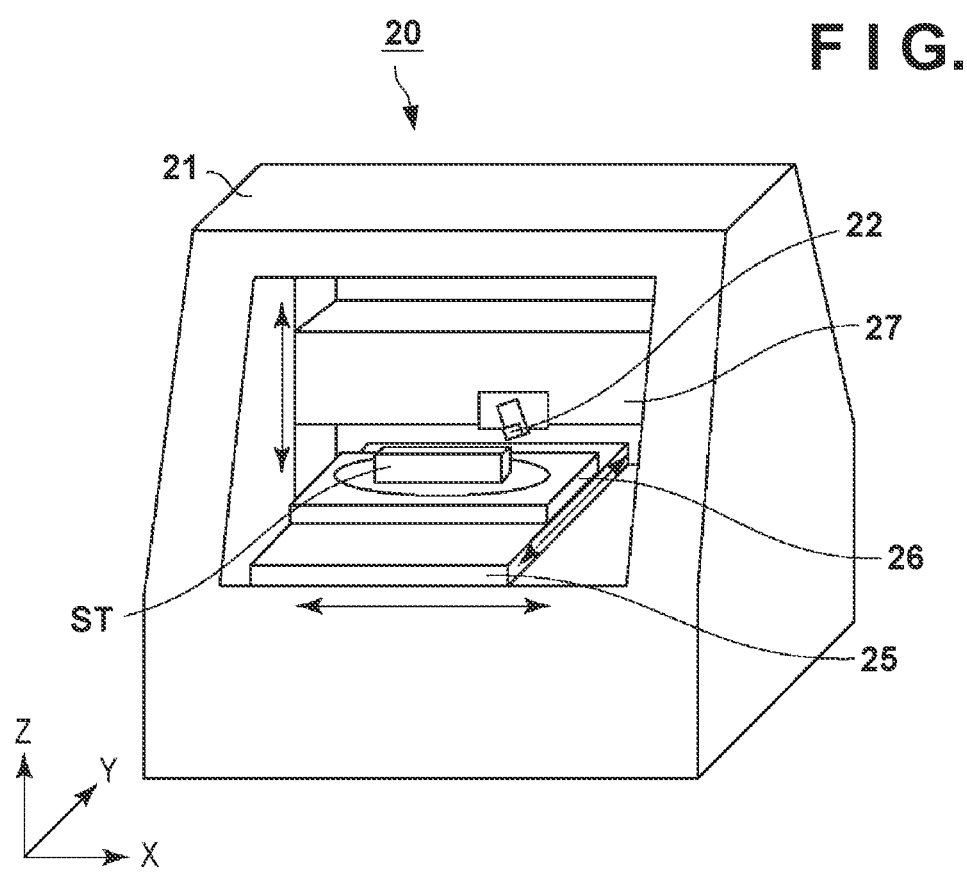
FIG. 2 is a view showing the arrangement of a processing apparatus that can be used to manufacture the diffraction device according to the embodiment.

FIG. 2 schematically shows a processing apparatus 20 that can be used to process the ZnSe member 12 in the structure ST in the processing step. The processing apparatus 20 is, for example, a high-precision processing machine capable of numerically controlling cutting processing on the order of several tens of nm, and the tool used in the processing apparatus 20 includes a diamond bite 22 having a sharp tip end and capable of obtaining a highly accurate processing transfer property.

The processing apparatus 20 includes an X-Y stage arranged in a high-rigidity housing 21 strong against external vibration. The X-Y stage is formed by an X stage 25 movable in the X direction and a Y stage 26 movable in the Y direction, and controls the position of the structure ST as a workpiece. In addition, a Z stage 27 movable in the Z direction while holding the diamond bite 22 is arranged in the housing 21. The Z stage 27 may be provided with a rotating mechanism for rotating the diamond bite 22.

Figure 3:
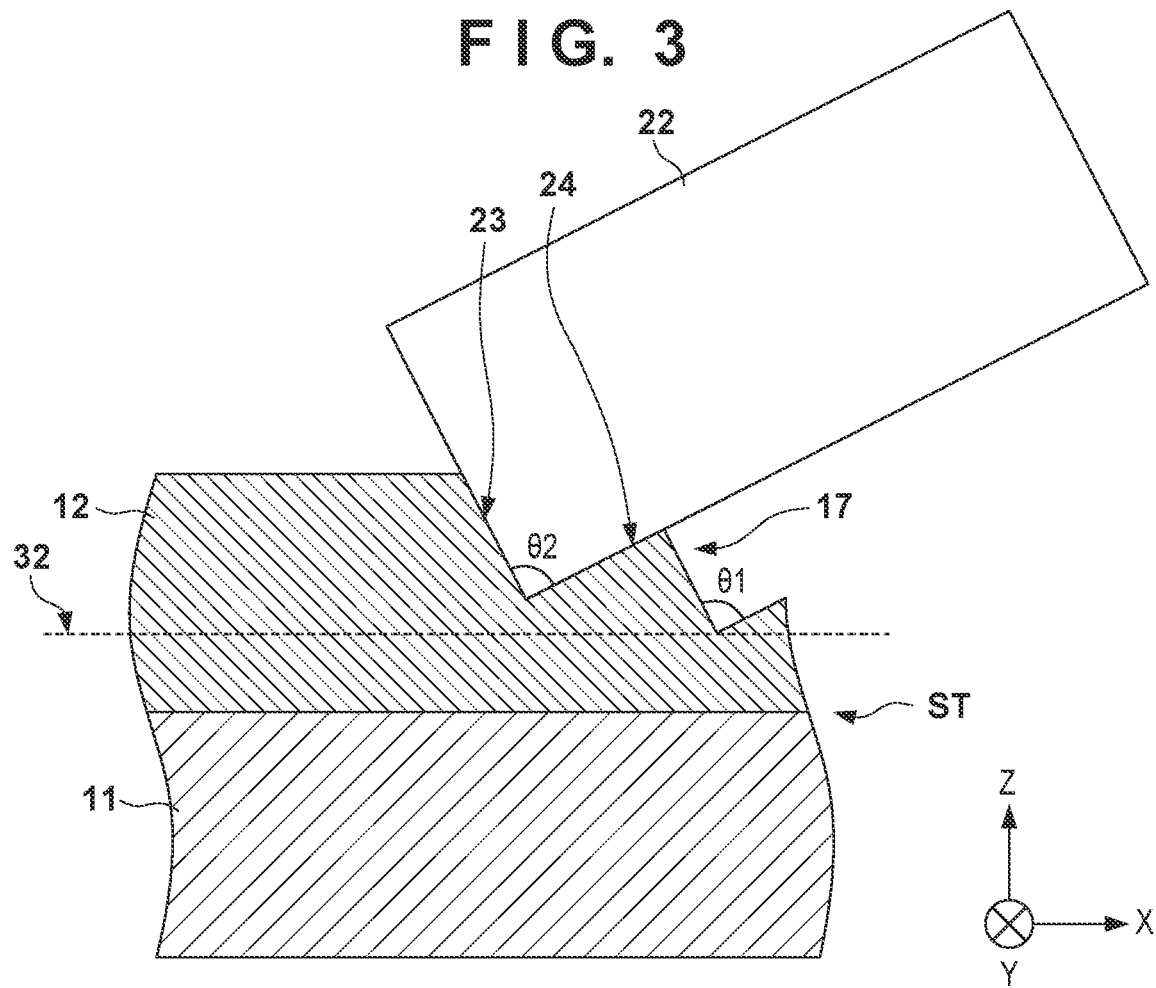
FIG. 3 is a view schematically showing how a ZnSe member is processed by the processing apparatus.

FIG. 3 schematically shows how the processing apparatus 20 processes the ZnSe member 12 of the structure ST. The processing apparatus 20 includes ridgeline cutting edges 23 and 24 that define a cross-sectional shape to be transferred to the ZnSe member 12, and an angle θ2 formed by the tip ends of the ridgeline cutting edges 23 and 24 is almost equal to an opening angle θ1 of a groove forming the diffraction grating 17, which is, for example, 85° to 90°. The roundness of each of the tip ends of the ridgeline cutting edges 23 and 24 should be as small as possible. The straight line accuracy of each of the ridgelines of the ridgeline cutting edges 23 and 24 is very high at the tip end portion.

The structure ST can be driven by the X-Y stage in a state in which the diamond bite 22 is lowered onto the structure ST so that the amount of cutting in a depth direction (Z direction) is, for example, 0.1 μm at a position where the diamond bite 22 and the structure ST as a workpiece face each other. The ZnSe member 12 of the structure ST undergoes cutting at the cutting speed based on the relative movement of the diamond bite 22 and the structure ST. The relative movement may be performed by moving the diamond bite 22. In order to prevent an overload on the diamond bite 22, the total cutting amount in the Z direction may be divided and the cutting with the divided cutting amount may be repeated. Further, the diamond bite 22 may be rotated in accordance with cutting conditions. In that case, since the cutting amount is determined by the rotation speed and the relative movement speed, the relative movement speed may be reduced to suppress the load onto the diamond bite 22. At the time of processing, it is preferable that oil mist is sprayed from the back side of the bite rake face to remove the processing heat and smoothly flow the chips.

According to this embodiment, the structure ST in which the ZnS member 11 and the ZnSe member 12 are coupled to each other is prepared, and the ZnSe member 12 of the structure ST is processed to form the diffraction grating 17 on the ZnSe member 12. With this method, it is possible to manufacture the diffraction device 1 having excellent optical characteristics. Since ZnS has a high transmittance in the infrared range including the near infrared range, the diffraction device 1 can be preferably incorporated in an optical system of a spectroscopic apparatus that can spectrally disperse light in the infrared range.

Figure 4:
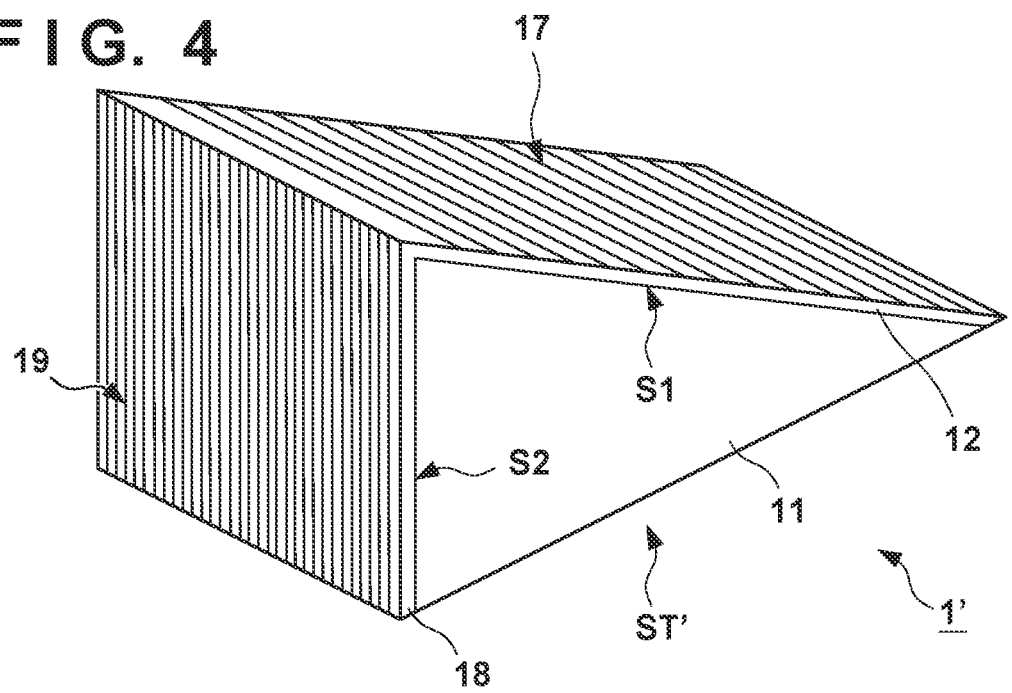
FIG. 4 is a view schematically showing the arrangement of an application example of the diffraction device according to the embodiment.

FIG. 4 schematically shows a diffraction device 1' as an application example of the above-described embodiment. Matters not mentioned regarding the diffraction device 1' can follow the description regarding the diffraction device 1. The diffraction device 1' includes a structure ST' including the ZnS member 11, and the ZnSe member 12 and a ZnSe member 18 coupled to the ZnS member 11. The first ZnSe member 12 is coupled to the first face S1 of the ZnS member 11. The diffraction grating 17 is provided on the ZnSe member 12. The second ZnSe member 18 is coupled to the second face S2 of the ZnS member 11. A second diffraction grating 19 is provided on the second ZnSe member 18. The first diffraction grating 17 and the second diffraction grating 19 can be arranged such that the periodic direction of the first diffraction grating 17 and the periodic direction of the second diffraction grating 19 are orthogonal to each other. According to such an arrangement, when the diffraction orders of the first diffraction grating 17 are output in a state in which a plurality of the orders are overlapped with each other, the second diffraction grating 19 can separate them in the order direction. The grating interval of the second diffraction grating 19 can be set smaller than the grating interval of the first diffraction grating 17. Conversely, the grating interval of the first diffraction grating 17 can be set larger than the grating interval of the second diffraction grating 19.

In the immersion diffraction device, diffraction is performed in a material having a higher refractive index (n) than that of a general reflective diffraction device (diffraction grating), so that the spectral wavelength is shortened in the material in inverse proportion to the refractive index (n). Therefore, if the immersion diffraction device has the same size as the reflective diffraction device, it can obtain a high resolution in proportion to the refractive index (n). Conversely, if the immersion diffraction device has the same resolution as the reflective diffraction device, its size can be decreased to 1/n.

Figure 5:
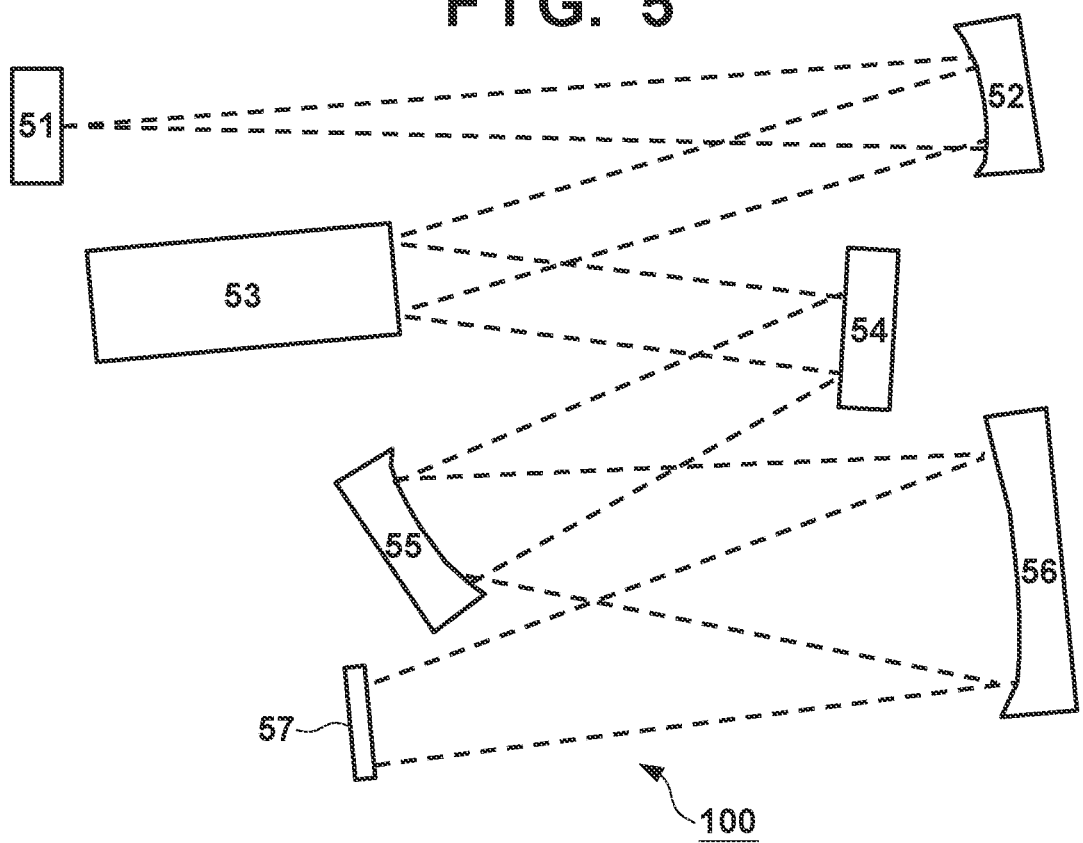
FIG. 5 is a view showing the arrangement of a spectroscopic apparatus according to an embodiment.

A spectroscopic apparatus incorporating the immersion diffraction device manufactured in accordance with the above-described method can have an excellent resolution or a compactness due to the immersion effect, and an excellent efficiency due to a good material transmittance and a good diffraction grating. FIG. 5 shows the arrangement of a spectroscopic apparatus 100 according to an embodiment of the present invention. The spectroscopic apparatus 100 can be referred to as an immersion spectroscopic apparatus. A light beam that spreads from a light guide unit 51, which can be formed by a slit or an optical fiber into which light to be spectrally dispersed enters, is collimated by a collimator 52, and can be spectrally dispersed by an immersion grating 53 (corresponding to the immersion diffraction device 1). The immersion grating 53 can be configured as a high-order diffraction device. In order to separate the overlapping orders from each other, a cross disperser 54 (a diffraction device that diffracts light in a direction orthogonal to the diffraction direction of the immersion grating 53) can be arranged downstream of the immersion grating 53. The diffracted light from the cross disperser 54 is deployed in a two-dimensional space for each wavelength, imaged on the light receiving face of an optical sensor 57 by condensing optical systems 55 and 56, and captured by the optical sensor 57.

By using the immersion diffraction device 1 as the immersion grating 53, due to the above-described immersion effect, it is possible to implement, for example, a resolution more than twice that of the conventional resolution, or a reduction in size to ½ with the same resolution. Further, in the immersion diffraction device, the diffraction angle is suppressed in accordance with the refractive index in the material that forms the immersion diffraction device. Therefore, unlike the reflective diffraction device which generates a desired diffraction angle in the face to spread light, the spread of light is relatively suppressed until the emission portion, and the light is spread to a desired divergence angle at the emission portion. Such advantages are useful in implementing a compact and excellent spectroscopic apparatus.

Figure 6:
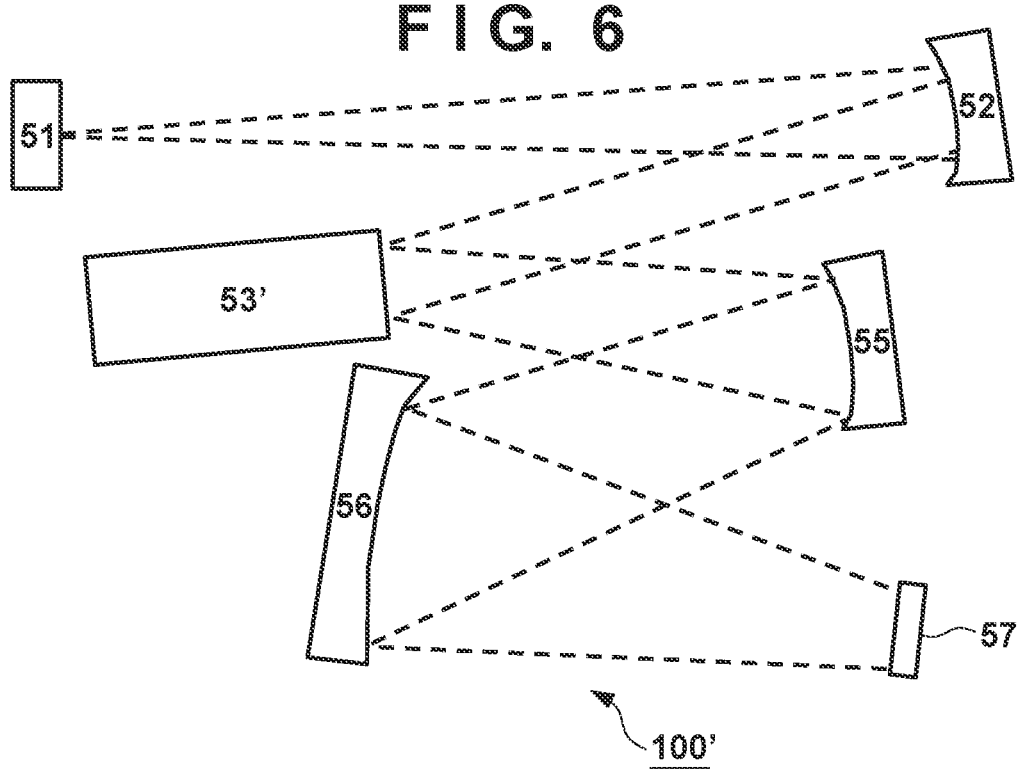
FIG. 6 is a view showing the arrangement of a spectroscopic apparatus according to another embodiment.

FIG. 6 shows the arrangement of a spectroscopic apparatus 100' according to another embodiment of the present invention. The spectroscopic apparatus 100' employs the immersion diffraction device 1' shown in FIG. 4 as the immersion grating 53 and the cross disperser 54 in the spectroscopic apparatus 100 shown in FIG. 5. That is, the immersion diffraction device 1' can have the functions of the immersion grating 53 and the cross disperser 54. Note that when a reflective diffraction device is employed, the immersion diffraction device 1' cannot have the function of the cross disperser.

The spectroscopic apparatus shown in each of FIGS. 5 and 6 is merely an exemplary spectroscopic apparatus, so that details such as the number of mirrors depend on the design, and the spectroscopic apparatus of the present invention is not limited thereto. The optical sensor 57 may be an image sensor, a line sensor, or a single light-receiving device. If the diffraction device is a first-order diffraction device, the cross disperser is unnecessary.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-135679, filed Jul. 23, 2019, which is hereby incorporated by reference herein in its entirety.

What is claimed is:

1. A diffraction device comprising a ZnS member and a ZnSe member coupled to the ZnS member, wherein a diffraction grating is provided on the ZnSe member.

2. The device according to claim 1, wherein the device is configured as an immersion diffraction device.

3. The device according to claim 1, wherein the diffraction grating is a blazed diffraction grating.

4. The device according to claim 1, wherein a maximum thickness of the ZnSe member is within a range of not less than 150 μm and not more than 1,000 μm.

5. The device according to claim 1, wherein the ZnS member includes a first face and a second face, the ZnSe member is coupled to the first face, a second ZnSe member is coupled to the second face, and a second diffraction grating is provided on the second ZnSe member.

6. The device according to claim 5, wherein a periodic direction of the diffraction grating and a periodic direction of the second diffraction grating are orthogonal to each other.

7. The device according to claim 5, wherein a grating interval of the diffraction grating is larger than a grating interval of the second diffraction grating.

8. The device according to claim 1, wherein the diffraction grating is configured to be capable of spectrally dispersing light in an infrared region.

9. A spectroscopic apparatus comprising an optical system that includes a diffraction device,
wherein the diffraction device comprises a ZnS member and a ZnSe member coupled to the ZnS member, a diffraction grating being provided on the ZnSe member.

10. A manufacturing method of manufacturing a diffraction device, comprising:
forming a structure in which a ZnS member and a ZnSe member are coupled to each other; and
processing to form a diffraction grating on the ZnSe member in the structure.

11. The method according to claim 10, wherein the processing is performed using a diamond tool.

12. The method according to claim 10, wherein in the forming, the structure is formed by coupling the ZnSe member to the ZnS member by optical contact bonding.

13. The method according to claim 10, wherein in the forming, the ZnSe member is formed by depositing a ZnSe material on the ZnS member using a deposition method, thereby forming the structure.

14. The method according to claim 13, wherein the deposition method includes a CVD method.

* * * * *